United States Patent Office.

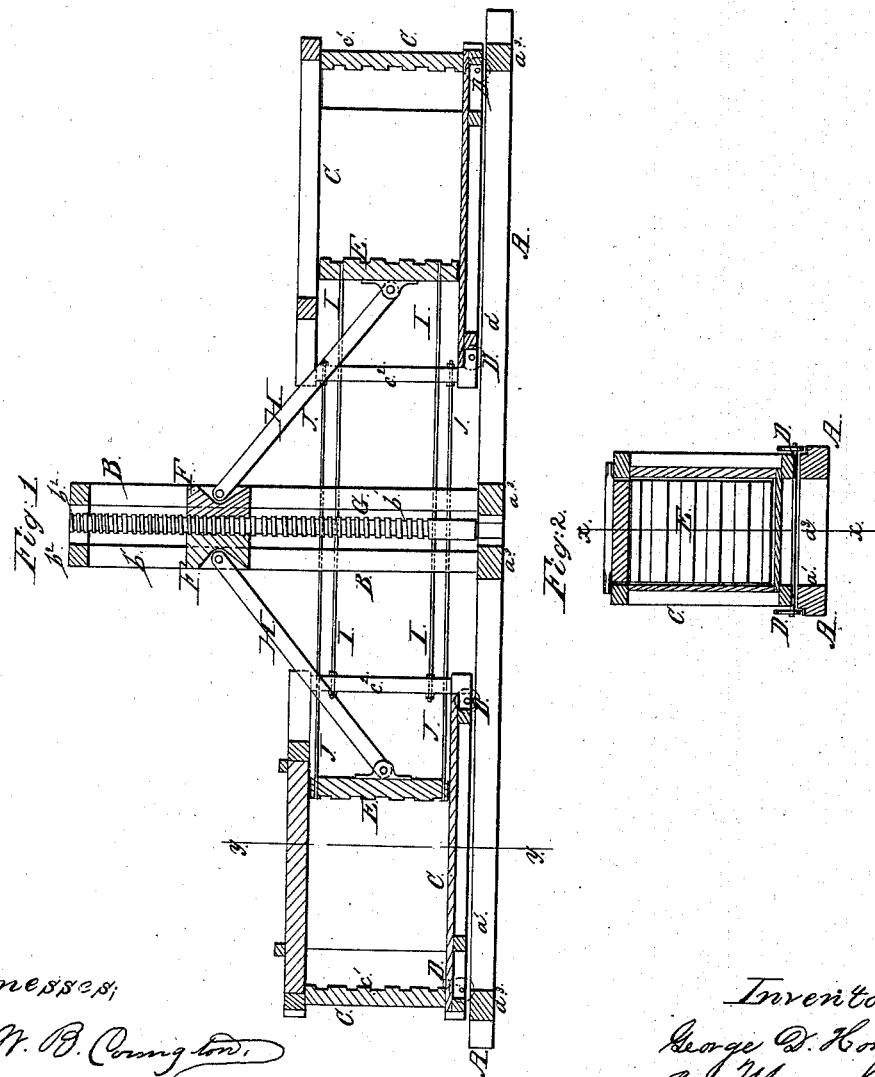

IMPROVEMENT IN BALING PRESS.

GUY D. HOWE, OF LEWISPORT, KENTUCKY.

Letters Patent No. 60,376, dated December 11, 1866.

The Schedule referred to in these Letters Patent and making part of the same.

TO ALL WHOM IT MAY CONCERN:

Be it known that I, GUY D. HOWE, of Lewisport, in the county of Hancock, and State of Kentucky, have invented a new and useful improvement in Baling Press; and I do hereby declare that the following is a full, clear, and exact description thereof, which will enable others skilled in the art to make and use the same, reference being had to the accompanying drawings, forming a part of this specification, in which—

Figure 1 is a vertical longitudinal section of my improved press taken through the line $x\,x$, fig. 2.

Figure 2 is a vertical cross-section taken through the line $y\,y$, fig. 1.

Similar letters of reference indicate like parts.

My invention has for its object to furnish a baling press by means of which two bales may be pressed at the same time, and which may be built and operated in a less space than is required for the presses now in use. And it consists of a system of rods and movable boxes, in combination with the followers and frames of the machine, as hereinafter more fully described.

A is the horizontal frame which supports the machine, and upon which the movable boxes move. This frame consists of horizontal beams $a^1$ and $a^2$, firmly connected by cross-beams, $a^3$, as shown. B is an upright frame firmly connected to the horizontal frame, A. The posts, $b^1$, of this frame, are connected at the top by cross-timbers, $b^2$. C, are movable boxes, which move upon wheel or rollers, D, upon tracks prepared for them upon the frame, A, as shown. The frames of these boxes should be made strong enough to withstand the pressure necessary to be applied in pressing the bales, and their ends which are toward the upright frame, B, are open, the top and sides being furnished with doors in the ordinary manner. The ends, $e'$, are grooved for the reception of the hoops or bands for confining the bale after it has been pressed. E, are the followers, which slide in guides prepared for them upon the frame of the boxes, C, as shown. F is the cross-head which slides up and down within the upright frame, B. This cross-head may be operated by a screw, G, passing through it, as shown in red in fig. 1, or it may be operated by any other suitable device. To the sides of this cross-head, F, are pivoted two bars, H, the other ends of which are pivoted to the centres of the followers, E. These bars should be of such a length that when the cross-head, F, has been lowered so as to bring the bars, H, into a horizontal position, the ends, $c^1$, of the boxes, C, and the followers, E, shall have approached so near each other as to have compressed the bale to the required size. I I, and, J J, are sets of rods connecting the followers, E, and the boxes, C. One end of the rods, I, are attached to the cross-pieces, $c^2$, of the boxes, C, at one end of the press, and their other ends are attached to the follower, F, in the other end of the press, as shown in fig. 1. The other set of rods, J, are attached at one end to the other follower, F, and at their other end to the other box, C, so that each follower is connected by a set of rigid rods to the box at the other end of the press. These rods are secured to the boxes and followers by nuts working upon screw-threads cut upon the ends of the rods, so that the press may be set so as to form bales of any required size. It will be observed that when the cross-head, F, is raised by the screw, G, or equivalent device, the followers, E, are drawn toward the upright frame, B, each follower by means of the rigid rods pushes the box on the opposite end of the press outward or away from the upright frame, B. This opens up the spaces between the followers, E, and the ends, $c^1$ for the reception of the material to be pressed, then by pushing down the cross-head, F, the followers, E, are pushed outward, and the boxes, $c^1$, drawn inward, compressing the material into a bale of the required size.

I claim as new, and desire to secure by Letters Patent—

The movable boxes C, when used in combination with a suitable press, constructed and operating in the manner and for the purpose herein specified.

GUY D. HOWE.

Witnesses:
ALBERT C. HOWE,
G. W. YEAGER,